United States Patent
Parundekar et al.

(10) Patent No.: US 9,389,831 B2
(45) Date of Patent: Jul. 12, 2016

(54) SHARING SPEECH DIALOG CAPABILITIES OF A VEHICLE

(71) Applicant: TOYOTA JIDOSHA KABUSHIKI KAISHA, Toyota-shi, Aichi-ken (JP)

(72) Inventors: Rahul Parundekar, Sunnyvale, CA (US); John Mark Agosta, Mountain View, CA (US); Emrah Akin Sisbot, Mountain View, CA (US)

(*) Notice: Subject to any disclaimer, the term of this patent is extended or adjusted under 35 U.S.C. 154(b) by 57 days.

(21) Appl. No.: 14/453,335

(22) Filed: Aug. 6, 2014

(65) Prior Publication Data

US 2016/0041811 A1    Feb. 11, 2016

(51) Int. Cl.
| | | |
|---|---|---|
| G06F 3/16 | (2006.01) | |
| G10L 15/28 | (2013.01) | |
| G10L 13/04 | (2013.01) | |
| G10L 15/22 | (2006.01) | |
| G10L 15/18 | (2013.01) | |

(52) U.S. Cl.
CPC .............. *G06F 3/167* (2013.01); *G10L 13/043* (2013.01); *G10L 15/18* (2013.01); *G10L 15/22* (2013.01); *G10L 15/28* (2013.01); *G10L 2015/223* (2013.01)

(58) Field of Classification Search
CPC ....... G06F 3/167; G10L 13/043; G10L 15/18; G10L 15/22; G10L 15/28
USPC ........................................................ 704/275
See application file for complete search history.

(56) References Cited

U.S. PATENT DOCUMENTS

| | | | | |
|---|---|---|---|---|
| 6,988,026 B2* | 1/2006 | Breed | ................... | G07C 5/0808 701/31.4 |
| 7,103,460 B1* | 9/2006 | Breed | ................. | B60C 23/0408 701/29.1 |
| 7,126,583 B1* | 10/2006 | Breed | .................... | B60K 35/00 345/158 |
| 8,032,383 B1* | 10/2011 | Bhardwaj | ............... | G10L 15/30 455/420 |
| 8,340,975 B1* | 12/2012 | Rosenberger | ........... | G10L 15/22 704/270 |
| 8,806,033 B1* | 8/2014 | Vinapamula Venkata | ................. | H04L 67/141 709/228 |
| 9,036,509 B1* | 5/2015 | Addepalli | ............. | H04W 4/046 370/259 |
| 9,087,520 B1* | 7/2015 | Salvador | ................. | G10L 25/84 |
| 2002/0065661 A1* | 5/2002 | Everhart | ............... | H04M 1/271 704/275 |

(Continued)

*Primary Examiner* — Tammy Pham
*Assistant Examiner* — Edwin S Leland, III
(74) *Attorney, Agent, or Firm* — Burbage Law, P.C.; Elizabeth Ruzich; Jon Burbage

(57) ABSTRACT

The disclosure includes a speech-enabled device and method to share speech dialog capabilities of the speech-enabled device with a dumb device. The speech-enabled device includes a processor and a memory storing instructions that, when executed by the processor, cause the speech-enabled device to: receive speech dialog data of the dumb device that indicates a function of the dumb device; receive speech input; determine the function of the dumb device to be invoked based on the speech input by using the speech dialog data; generate a command effective to invoke the function of the dumb device based on the speech dialog data; and send the command to the dumb device to invoke the function of the dumb device.

20 Claims, 5 Drawing Sheets

(56) References Cited

U.S. PATENT DOCUMENTS

| | | | |
|---|---|---|---|
| 2003/0036360 A1* | 2/2003 | Russell | A42B 3/30 455/66.1 |
| 2004/0102977 A1* | 5/2004 | Metzler | G10L 15/22 704/275 |
| 2004/0130442 A1* | 7/2004 | Breed | B60C 11/24 340/443 |
| 2004/0260438 A1* | 12/2004 | Chernetsky | G10L 15/22 701/36 |
| 2005/0135573 A1* | 6/2005 | Harwood | H04M 1/6091 379/88.03 |
| 2005/0192727 A1* | 9/2005 | Shostak | B60C 11/24 701/37 |
| 2005/0206513 A1* | 9/2005 | Fallon | G08B 25/012 340/506 |
| 2005/0273218 A1* | 12/2005 | Breed | B60C 11/24 701/2 |
| 2006/0025897 A1* | 2/2006 | Shostak | B60C 23/005 701/1 |
| 2006/0041926 A1* | 2/2006 | Istvan | H04N 5/4403 725/133 |
| 2006/0075429 A1* | 4/2006 | Istvan | H04N 7/163 725/39 |
| 2006/0168627 A1* | 7/2006 | Zeinstra | H04M 1/6091 725/75 |
| 2008/0037444 A1* | 2/2008 | Chhabra | H04W 84/18 370/254 |
| 2009/0132256 A1* | 5/2009 | Geldbach | G10L 15/22 704/275 |
| 2010/0105356 A1* | 4/2010 | Ghazarian | H04L 12/5895 455/410 |
| 2010/0263015 A1* | 10/2010 | Pandey | H04N 21/42203 725/153 |
| 2011/0125503 A1* | 5/2011 | Dong | G10L 15/22 704/275 |
| 2011/0151838 A1* | 6/2011 | Olincy | H04M 1/64 455/412.1 |
| 2011/0151842 A1* | 6/2011 | Olincy | H04M 3/42348 455/414.1 |
| 2011/0151852 A1* | 6/2011 | Olincy | H04M 1/72552 455/418 |
| 2011/0161076 A1* | 6/2011 | Davis | G06F 3/04842 704/231 |
| 2011/0213657 A1* | 9/2011 | O'Malley | G06Q 30/0251 705/14.49 |
| 2013/0117021 A1* | 5/2013 | James | G01C 21/362 704/235 |
| 2013/0315038 A1* | 11/2013 | Ferren | G06K 9/3266 367/197 |
| 2014/0057610 A1* | 2/2014 | Olincy | H04W 4/16 455/414.1 |
| 2014/0167931 A1* | 6/2014 | Lee | G08C 17/02 340/12.5 |
| 2014/0195252 A1* | 7/2014 | Gruber | G10L 15/22 704/275 |
| 2015/0006182 A1* | 1/2015 | Schmidt | G10L 15/30 704/275 |
| 2015/0006184 A1* | 1/2015 | Marti | G10L 15/28 704/275 |
| 2015/0053781 A1* | 2/2015 | Nelson | F24F 11/006 236/1 C |
| 2015/0058447 A1* | 2/2015 | Albisu | H04L 67/02 709/219 |

\* cited by examiner

SHARING SPEECH DIALOG CAPABILITIES OF A VEHICLE

BACKGROUND

The specification relates to sharing speech dialog capabilities between speech-enabled and dumb devices.

Providing an ability for devices to understand and communicate with spoken language has been a goal since the early days in user interface (UI) development. The accuracy of speech recognition and the quality of synthesized dialog has improved dramatically in recent years, and is now being practically implemented on many devices. However, many legacy devices and even new devices lack speech dialog capabilities, e.g., speech recognition and speech synthesis, or include only limited speech dialog capabilities.

SUMMARY

According to one innovative aspect of the subject matter described in this disclosure, a speech-enabled device includes a processor and a memory communicatively coupled to the processor. The memory stores instructions that, when executed by the processor, cause the speech-enabled device to receive speech dialog data of a dumb device that indicates a function of the dumb device; receive speech input; determine the function of the dumb device to be invoked based on the speech input by using the speech dialog data; generate a command effective to invoke the function of the dumb device based on the speech dialog data; and send the command to the dumb device to invoke the function of the dumb device.

In general, another innovative aspect of the subject matter described in this disclosure may be embodied in methods that include: receiving speech dialog data of a dumb device that indicates a function of the dumb device; receiving speech input; determine the function of the dumb device to be invoked based on the speech input by using the speech dialog data; generating a command effective to invoke the function of the dumb device based on the speech dialog data; and sending the command to the dumb device to invoke the function of the dumb device.

Other aspects include corresponding methods, systems, apparatus, and computer program products for these and other innovative aspects.

The disclosure is particularly advantageous in a number of respects. For example, the system described herein can share the speech dialog capabilities of a speech-enabled device with a dumb device while providing a seamless dialog with a user in which the user can engage in spoken dialog with either or both of the speech-enabled device and the dumb device through the speech-enabled device. Additionally or alternatively, the speech-enabled device can share its speech dialog capabilities with dumb devices that are not known in advance. Thus, according to some implementations, it is not necessary for the speech-enabled device to come pre-loaded with the speech processing data of a dumb device it encounters and with which it shares its speech dialog capabilities. Instead, the speech processing data and other speech dialog data of unknown dumb devices can be integrated with the speech-enabled device on the fly.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

System Overview

Figure 1:
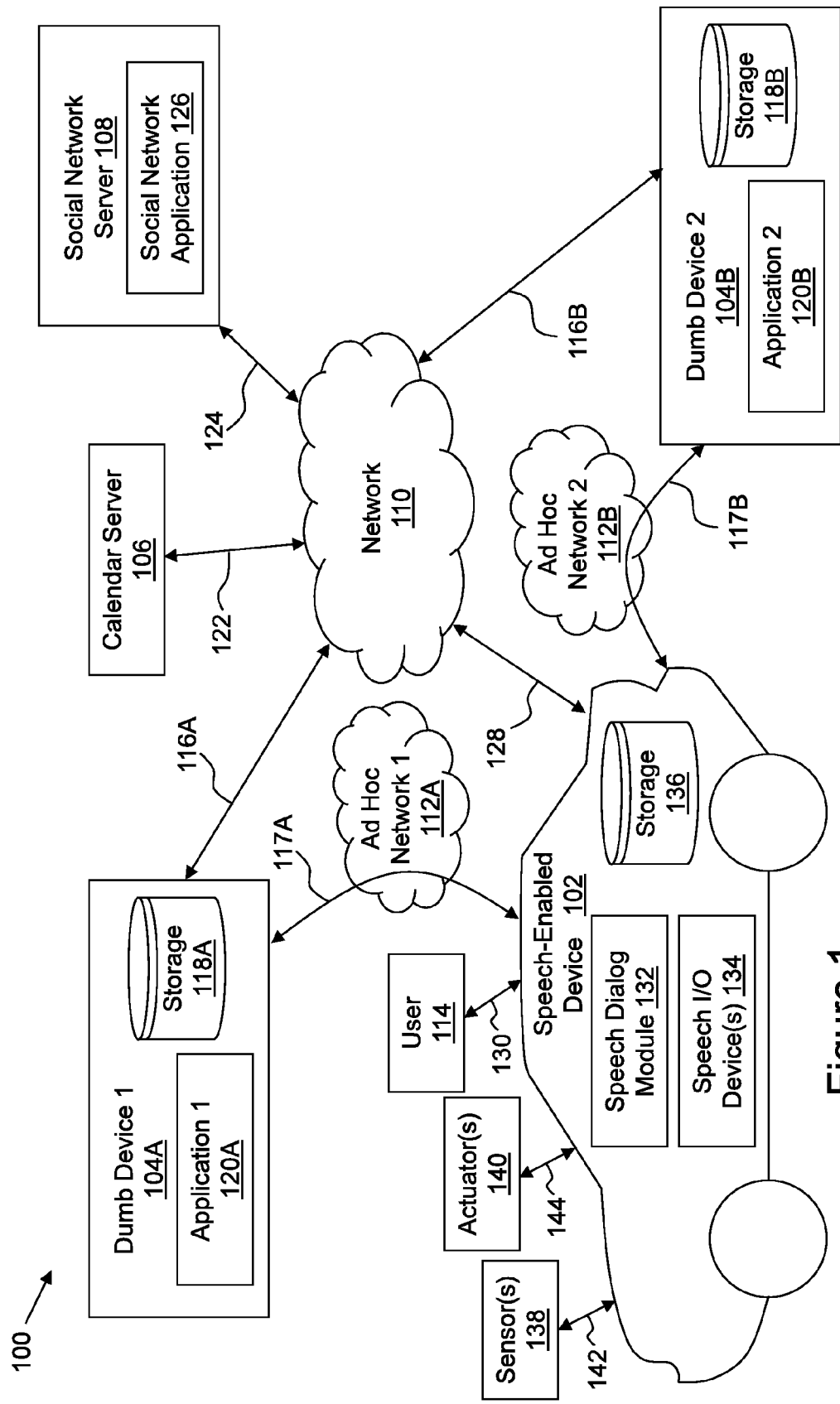
FIG. 1 is a block diagram illustrating an example shared speech dialog system.

FIG. 1 is a block diagram illustrating an example shared speech dialog system 100 (hereinafter system 100). The system 100 includes a speech-enabled device 102 and one or more dumb devices 104A, 104B (generically referred to herein as dumb device 104 or dumb devices 104). The system 100 may additionally include one or more of a calendar server 106 and a social network server 108. In the illustrated implementation, two or more of these entities may be communicatively coupled by a network 110, a first ad hoc network 112A, and/or a second ad hoc network 112B. The first and/or second ad hoc networks 112A and 112B may be generically referred to herein as ad hoc network 112 or ad hoc networks 112. The system 100 may include other servers or devices not shown in FIG. 1 including, for example, a traffic server for providing traffic data, a weather server for providing weather data, and a map server for providing map data, etc. The speech-enabled device 102 can be accessed by a user 114

The speech-enabled device 102 and the dumb devices 104 in FIG. 1 are illustrated by way of example. While FIG. 1 illustrates a single speech-enabled device 102 and two dumb devices 104, the disclosure applies to a system architecture having one or more speech-enabled devices 102 and one or more dumb devices 104. Furthermore, although FIG. 1 illustrates one network 110 coupled to the speech-enabled device 102, the dumb devices 104, the calendar server 106, and the social network server 108, in practice one or more networks can be connected to any two or more of these entities. For instance, FIG. 1 illustrates the ad hoc network 112A connected to the dumb device 104A and the speech-enabled device 102, and the ad hoc network 112B connected to the dumb device 104B and the speech-enabled device 102. The ad hoc networks 112A and 112B may be generically referred to herein as ad hoc network 112 or ad hoc networks 112. While FIG. 1 includes one calendar server 106 and one social network server 108, the system 100 could include one or more calendar servers 106 and one or more social network servers 108.

The network 110 can be a conventional type, wired or wireless, and may have numerous different configurations including a star configuration, token ring configuration, or other configurations. Furthermore, the network 110 may include a local area network (LAN), a wide area network (WAN) (e.g., the Internet), or other interconnected data paths across which multiple devices and/or entities may communicate. In some implementations, the network 110 may be a peer-to-peer network. The network 110 may also be coupled to or includes portions of a telecommunications network for sending data in a variety of different communication protocols. In some implementations, the network 110 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, etc. In some implementations, the network 110 may include a global positioning system (GPS) satellite or multiple GPS satellites for providing GPS navigation to the speech-enabled device 102. The network 110 may be a mobile data network that may include third-generation (3G), fourth-generation (4G), long-term evolution (LTE), Voice-over-LTE ("VoLTE") or any other mobile data network or combination of mobile data networks.

Each of the ad hoc networks 112 may include a decentralized network that does not rely on pre-existing infrastructure, instead being established by the speech-enabled device 102 and one or more of the dumb devices 104 using hardware and/or software of the speech-enabled device 102 and the one or more of the dumb devices 104 that connect to the ad hoc networks 112. For example, the ad hoc networks 112 may lack routers used in wired networks and/or access points used in managed wireless networks. In some implementations, the ad hoc networks 112 include Bluetooth® communication networks, IEEE 802.11 wireless networks in ad hoc modes of operation, or other suitable ad hoc networks. In some implementations, devices that connect to the ad hoc networks 112 may have equal status on the ad hoc networks 112 and may be free to associate with any other ad hoc network device in link range.

Alternatively or additionally, the speech-enabled device 102 may establish different ad hoc networks 112 with different dumb devices 104 at the same, different, or overlapping times depending at least in part on network communication capabilities of the dumb devices 104 and the speech-enabled device 102. For example, the ad hoc network 112A may include a Bluetooth network while the ad hoc network 112B may include an IEEE 802.11 wireless network in an ad hoc mode of operation, provided the dumb device 104 includes a Bluetooth communication interface, the dumb device 104B includes an IEEE 802.11 communication interface, and the speech-enabled device 102 includes both Bluetooth and IEEE 802.11 communication interfaces. The speech-enabled device 102 may thereby coordinate the establishment of a system, or a system of systems using one or more ad hoc networks 112 according to the capabilities of the dumb devices 104, and may share speech dialog capabilities with the one or more dumb devices as described in more detail herein.

The dumb devices 104 can each be a hardware device that includes a processor, a memory, and network communication capabilities. In the illustrated implementation, the dumb devices 104 are coupled to the network 110 via signal lines 116A and 116B. Alternatively or additionally, the dumb device 104A or 104B may be coupled through the ad hoc network 112A or 112B to the speech-enabled device 102 via a signal line 117A or 117B. The dumb devices 104 send and receive data to and from other entities of the system 100 via the network 110 and/or the dumb devices send and receive data to and from the speech-enabled device 102 via the ad hoc networks 112A and 112B.

In general, each of the dumb devices 104 may include a device that lacks speech dialog capabilities altogether, or that includes only rudimentary speech dialog capabilities or speech dialog capabilities that are less than speech dialog capabilities of the speech-enabled device 102. Further, each of the dumb devices 104 may be a mobile device or a stationary device. Accordingly, each of the dumb devices 104 may include, but is not limited to, a parking meter, a vending machine (e.g., for snacks, drinks, movie tickets, mass transit tickets, etc.), an elevator, a gas pump, drive thru order elicitation device, a toll collecting device, a vehicle (e.g., an automobile, a bus), a bionic implant, a wearable device, a laptop computer, a tablet computer, a mobile telephone, a personal digital assistant (PDA), a mobile e-mail device, a portable game player, a portable media player, a connected home appliance, or another electronic device that is capable of accessing the network 110

The dumb devices 104 each include storage 118A or 118B (generically referred to herein as storage 118) for storing data to provide at least some of the functionality described herein. The storage 118 is described below in more detail. In the illustrated implementation, the dumb devices 104 additionally include an application 120A or 120B (generically referred to herein as application 120 or applications 120). Each dumb device 104 may execute the corresponding application 120 to provide a function or functions. The function that is provided may depend on the nature of the dumb device 104. For example, if the dumb device 104A or 104B is a parking meter, the function provided by execution of the application 120A or 120B may be to collect funds from a user in exchange for the right to park a vehicle in a particular place for a limited amount of time. If the dumb device 104A or 104B is a vending machine, the function provided by execution of the application 120A or 120B may be to collect funds from a user in exchange for dispensing to the user a snack, drink, movie ticket, mass transit ticket, etc. If the dumb device 104A or 104B is an elevator, the function provided by execution of the application 120A or 120B may be to transport a user from one floor of a building to another floor of the building. If the dumb device 104A or 104B is a mobile telephone, the function provided by execution of the application 120A or 120B may be to make a phone call, create and send an SMS or MMS message, or other function associated with a mobile telephone. If the dumb device 104A or 104B is a portable media player, the function provided by execution of the application 120A or 120B may be to playback media (e.g., music or video) stored locally (e.g., in the storage 118A or 118B) or stored remotely and accessible over the network 110 or the ad hoc networks 112. The foregoing functions are described by way of example only and are merely illustrative of the functions that may be provided by the dumb devices 104 upon execution of the applications 120.

In some implementations, while the dumb devices 104 lack speech dialog capabilities altogether, or include only rudimentary speech dialog capabilities or speech dialog capabilities that are less than speech dialog capabilities of the speech-enabled device 102, the dumb devices 104 may include speech dialog data associated with the function or functions of the dumb devices 104. The speech dialog data for each of the dumb devices 104 may be accessed locally, e.g., in the corresponding storage 118, or the speech dialog data may be accessed remotely via the network 110, e.g., from a remote server (not shown). In some implementations, the speech dialog data may indicate a function of the corresponding dumb device 104 and a command effective to invoke the function and may include speech processing data for a speech-enabled device to recognize and interpret speech input relevant to the corresponding dumb device 104 and/or relevant to the corresponding function or command. In some implementations, the dumb devices 104 may provide its speech dialog data to a speech-enabled device, e.g., the speech-enabled device 102, to enable speech-based operation for the dumb devices 104 through the speech-enabled device, as described in more detail below.

The calendar server 106 can be a hardware server that includes a processor, a memory, and network communication capabilities. In the illustrated implementation, the calendar server 106 is coupled to the network 110 via a signal line 122. The calendar server 106 sends and receives data to and from other entities of the system 100 via the network 110. For example, the calendar server 106 may send data describing a user's calendar to the speech-enabled device 102 or other entities in the system 100 with permission from the user.

The social network server 108 can be a hardware server that includes a processor, a memory, and network communication capabilities. In the illustrated implementation, the social network server 108 is coupled to the network 110 via a signal line 124. The social network server 108 sends and receives data to and from other entities of the system 100 via the network 110. The social network server 108 includes a social network application 126. A social network can be a type of social structure where the user 114 and other users may be connected by a common feature or features. Each of the common features may include relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related.

The social network server 108 and the social network application 126 can be representative of one social network and there may be multiple social networks coupled to the network 110, each having its own server, application, and social graph. For example, a first social network may be more directed to business networking, a second may be more directed to or centered on academics, a third may be more directed to local business, a fourth may be directed to dating, and others may be of general interest or a specific focus.

In some implementations, the speech-enabled device 102 may include a vehicle (e.g., an automobile, a bus), a bionic implant, a wearable device, a laptop computer, a tablet computer, a mobile telephone, a personal digital assistant (PDA), a mobile e-mail device, a portable game player, a portable music player, or another electronic device that is capable of accessing the network 110 and/or of establishing ad hoc networks (e.g., ad hoc networks 112) with other entities of the system 100 (e.g., dumb devices 104). In some implementations, the speech-enabled device 102 may include a computing device that includes a memory and a processor. In the illustrated implementation, the speech-enabled device 102 is communicatively coupled to the network 110 via a signal line 128 and is communicatively coupled to the dumb device 104A or 104B through the ad hoc network 112A or 112B via the signal line 117A or 117B.

The user 114 may interact with the speech-enabled device 102 via a signal line 130. The user 114 may include a driver of the speech-enabled device 102 implemented as a vehicle, or more generally a user or operator of the speech-enabled device 102 and/or of the dumb devices 104.

In some implementations, the speech-enabled device 102 may include a speech dialog module 132, one or more speech input and/or output devices 134 (labeled "Speech I/O Device(s) 134" in FIG. 1 and referred to hereinafter as speech I/O device 134 or speech I/O devices 134), and storage 136 for storing data to provide at least some of the functionality described herein. The speech dialog module 132, the speech I/O devices 134, and the storage 136 will be described in more detail below.

In some implementations, the speech-enabled device 102 may include and/or may be communicatively coupled to one or more sensors 138 (labeled "Sensor(s) 138" in FIG. 1 and referred to hereinafter as sensor 138 or sensors 138) and/or to one or more actuators 140 (labeled "Actuator(s) 140" in FIG. 1 and referred to hereinafter as actuator 140 or actuators 140). The sensor 138 may be coupled to the speech-enabled device 102 via a signal line 142 and the actuator 140 may be coupled to the speech-enabled device 102 via a signal line 144.

Each of the sensors 138 may include, but is not limited to, a navigation sensor (e.g., a global positioning system (GPS) sensor), an infrared detector, a motion detector, a thermostat, a sound detector, or any other type of sensor. For example, the speech-enabled device 102 may include sensors 138 for measuring one or more of a current time, a location (e.g., a latitude, longitude, and altitude of a location), an acceleration of a vehicle, a velocity of a vehicle, a fuel tank level, a behavior of a driver, environmental information inside and/or outside of the vehicle, etc. Although not illustrated in FIG. 1, one or more of the dumb devices 104A may include and/or may be communicatively coupled to one or more sensors, e.g., the sensors 138, which may assist or enable a function or functions of the dumb devices 104.

Each of the actuators 140 may generally include a motor or other actuator to move or control a mechanism or system. The actuators 140 may be operated by any source of energy that may include, but is not limited to, electric current or voltage, hydraulic fluid pressure, or pneumatic pressure, and may convert the energy into motion. The actuators 140 may assist or enable a function or functions of the speech-enabled device 102. Although not illustrated in FIG. 1, one or more of the dumb devices 104A may include and/or may be communicatively coupled to one or more actuators, e.g., the actuators 140, which may assist or enable a function or functions of the dumb devices 104.

The speech dialog module 132 may include code and routines for implementing speech-based operation of the speech-enabled device 102 by the user 114 and/or speech-based operation of one or more of the dumb devices 104. In some implementations, speech dialog data of the speech-enabled device 102 and/or of one or more of the dumb devices 104 may be stored, at least temporarily, in the storage 136. The speech dialog data may include a command portfolio of the speech-enabled device 102 and/or of the dumb devices 104 as well as speech processing data that includes data relevant for speech recognition and interpretation of user dialog (e.g., spoken utterances). In some implementations, the speech dialog module 132 can be implemented using hardware including a field-programmable gate array (FPGA) or an application-specific integrated circuit (ASIC). In some other implementations, the speech dialog module 132 can be implemented using a combination of hardware and software. The speech dialog module 132 may be stored in a combination of the devices and servers, or in one of the devices or servers of FIG. 1. The speech dialog module 132 is described below in more detail.

The speech I/O devices 134 may include hardware and/or software for converting speech (e.g., spoken utterances) to digital data and/or for synthesizing speech by, e.g., converting digital data to an audible utterance. For example, the speech I/O devices 134 may include a speech input device including a speech-to-digital data transducer configured to generate speech input data (referred to hereinafter as "speech input") as a digital representation of a spoken utterance of a user. Alternatively or additionally, the speech I/O devices 134 may include a speech output device including a digital data-to-speech transducer configured to synthesize speech by converting speech output data (referred to hereinafter as "speech output") to an audible utterance.

Each of the storage 118 and the storage 136 can include a non-transitory storage medium that stores data for providing at least some of the functionality described herein. The storage 118 and/or 136 may include a dynamic random access memory (DRAM) device, a static random access memory (SRAM) device, flash memory, or some other memory devices. In some implementations, the storage 118 and/or 136 may also include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some implementations, the storage 118 stores speech dialog data of the corresponding dumb device 104 and the storage 136 stores speech dialog data of the speech-enabled device 102. Alternatively or additionally, the storage 136 at least temporarily stores speech dialog data of one or more of the dumb devices 104 while the speech-enabled device 102 is connected to the one or more of the dumb devices 104 via the corresponding ad hoc network 112.

Alternatively or additionally, the storage 136 may store sensor data of the speech-enabled device 102 that may be generated by the sensors 138, while the storage 118 may store sensor data of the dumb devices 104 that may be generated by sensors included in or communicatively coupled to the dumb devices. In some implementations, the sensor data may be used to estimate parameters associated with commands and/or functions of the speech-enabled device 102 and/or the dumb devices 104.

Figure 2:
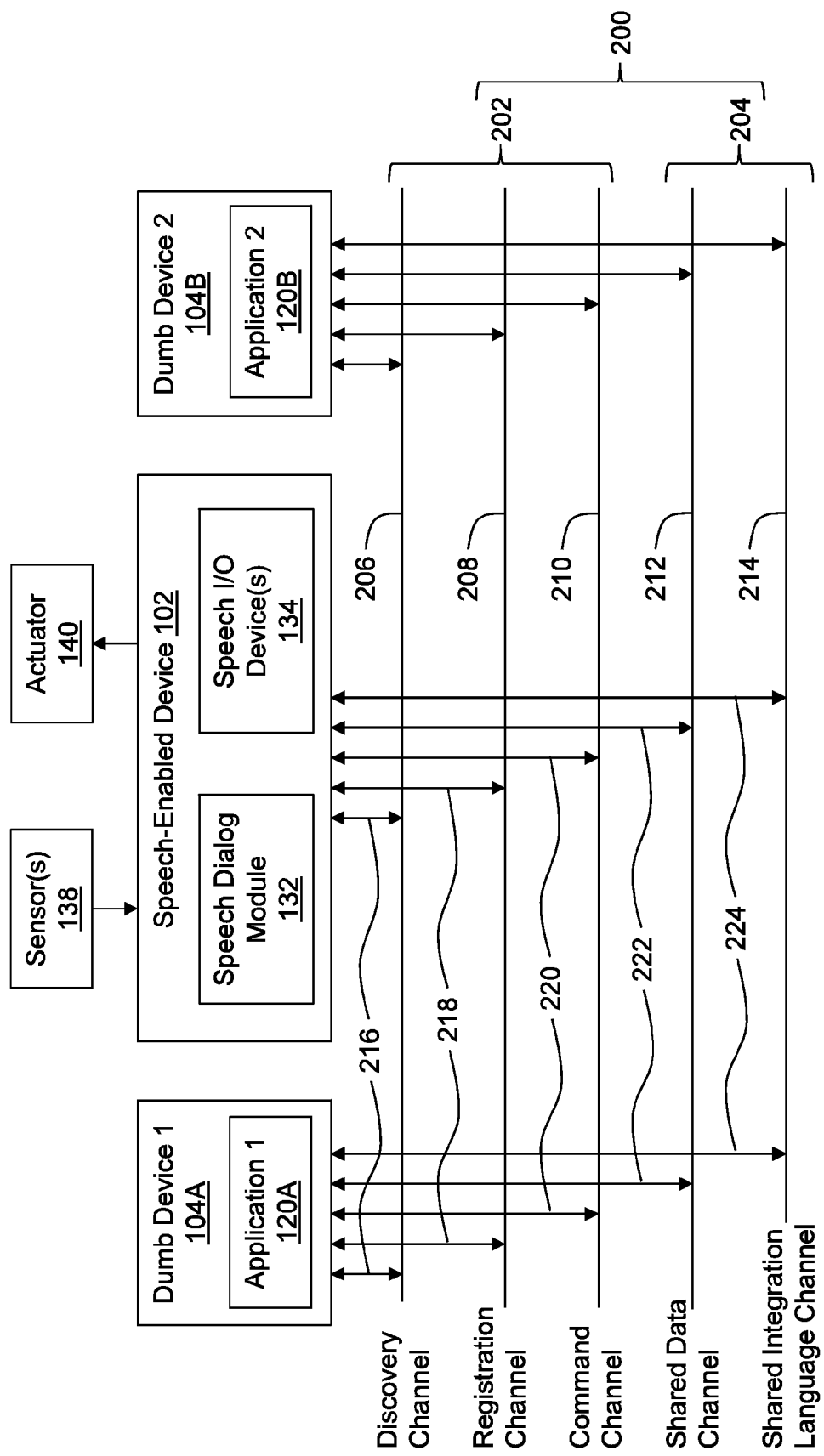
FIG. 2 is a block diagram illustrating various devices that may be included in the shared speech dialog system of FIG. 1.

FIG. 2 is a block diagram illustrating the speech-enabled device 102 and the dumb devices 104, as well as an architecture of a communication bus 200 that may be implemented between the speech-enabled device 102 and the dumb devices 104 within the one or more ad hoc networks 112. In the illustrated implementation, the communication bus 200 is logically divided into a command bus 202 and a data bus 204. The command bus 202 is logically subdivided into a discovery channel 206, a registration channel 208, and a command channel 210. The data bus is logically subdivided into a shared data channel 212 and a shared integration language channel 214.

The discovery channel 206 may be used by the dumb devices 104 to discover the speech-enabled device 102 or another device that enables speech-based operations for the dumb devices 104, or vice versa.

The registration channel 208 may be used by the dumb devices 104 to register their speech dialog data with the speech-enabled device 102. Registering speech dialog data with the speech-enabled device 102 may include sending the speech dialog data to the speech-enabled device 102. The speech dialog data of the dumb devices 104 may include a command portfolio of the dumb devices 104 including at least one command effective to invoke a function of the dumb devices 104. The speech dialog data of the dumb devices 104 may also include speech processing data that includes data relevant for speech recognition and interpretation of user dialog (e.g., spoken utterances).

Alternatively or additionally, the speech-enabled device 102 may proactively discover other speech-enabled devices using the discovery channel 206 and/or may receive speech dialog data from the other speech-enabled devices using the registration channel 208 to add to, update, and/or enrich the speech dialog data of the speech-enabled device 102.

The command channel 210 may be used by the speech-enabled device 102 to send, to the dumb devices 104, commands corresponding to or associated with functions of the dumb devices 104.

The shared data channel 212 may be used by the speech-enabled device 102 to forward data related to execution of commands to the dumb devices 104. The shared data channel 212 may alternatively or additionally be used to transfer data between the speech-enabled device 102 and the dumb devices 104 that may be relevant to understanding or generating dialog between a user and the speech-enabled device 102. Such data may include information to be conveyed as spoken dialog to/from the user and information about conversation logic states that form intermediate steps in dialog with the user (e.g., requests for confirmation, user responses to confirmation requests, etc.). Depending on the capabilities of the dumb devices 104, the data exchanged on the shared data channel 212 may be in the form of sound, text, or other types of data.

The shared integration language channel 214 may be used for exchanging integration metadata, also sometimes referred to herein as a shared integration language, between the speech-enabled device 102 and the dumb devices 104. The integration metadata or the shared integration language may be used as a common structure for speech processing data received from the dumb devices 104, e.g., via the registration channel 208.

An example implementation will be discussed that involves the dumb device 104A and the speech-enabled device 102. The dumb device 104A discovers the speech-enabled device 102 or the speech-enabled device 102 discovers a particular function (e.g., a service) offered by the dumb device 104A, as denoted at 216. The discovery may occur via the discovery channel 206 which may be included in the command bus 202 of the communication bus 200 and/or via an ad hoc network. In these and other implementations, the ad hoc network, and thus the communication bus 200, may be established between the dumb device 104A and the speech-enabled device 102 which may facilitate discovery and the exchange of other data via the channels 206, 208, 210, 212, and 214 of the communication bus 200.

The dumb device 104A may register speech dialog data with the speech-enabled device 102, as generally denoted at 218. Registering the speech dialog data with the speech-enabled device 102 may include the dumb device 104A sending the speech dialog data to the speech-enabled device 102 and/or the speech-enabled device 102 receiving the speech dialog data. The speech dialog data may include or indicate a function of the dumb device 104A, a command effective to invoke the function, speech processing data for the speech-enabled device 102 to recognize and interpret speech input relevant to the dumb device 104A, or other speech dialog data. The function may include services or operations that the dumb device 104A is capable of performing. The command effective to invoke the function may include a signal or data that, when received at the dumb device 104A, is effective to invoke the function. The speech processing data may include vocabulary, grammar, and conversation logic associated with the command or the function. The vocabulary may include one or more terms of speech input and/or speech output associated with invocation of the command. The grammar may include a set of rules that constrain word sequence and sentence structure of the one or more terms of speech input and/or speech output. The conversation logic may define intermediate logic states associated with the command.

The speech processing data of the dumb device 104A, as well as speech processing data of the speech-enabled device 102, may be represented in the integration metadata or the shared integration language described previously with respect to the shared integration language channel 214. The integration metadata or the shared integration language may include a common description language for describing speech processing data. The speech-enabled device 102 may integrate the speech processing data of the dumb device 104A with the speech processing data of the speech-enabled device 102 since both are in the shared integration language.

A user may utter a speech command, which is an example of a spoken utterance of the user. Other spoken utterances may include confirmations by the user, e.g., responsive to requests for confirmation by the speech-enabled device 102. The speech-enabled device 102 may receive a spoken utterance and convert it to speech input representing the spoken utterance. The speech-enabled device 102 may interpret the speech input based on the speech dialog data of the dumb device 104A, of the speech-enabled device 102, or of any other devices that have provided their speech dialog data to the speech-enabled device 102. The speech-enabled device 102 may interpret the speech input as invoking a function of the dumb device 104A. Based on the speech dialog data of, e.g., the dumb device 104A, the speech-enabled device 102 may generate a command effective to invoke the function of the dumb device 104A and may route or otherwise send the command to the dumb device 104A, as denoted at 220. In some implementations, the command may be sent to the dumb device 104A via the command channel 210.

In some implementations, a command that is to be executed to invoke a function may have intermediate steps. For example, execution of a command may be initiated but may not complete until confirmation by or further communication with the user. The dumb device 104A or the speech-enabled device 102 may return a conversation logic state in the shared integration language. The conversation logic state may be converted to speech output and synthesized by the speech-enabled device 102 as an audible utterance to the user. Alternatively or additionally, the dumb device 104A may include some, but not all, of the speech dialog capabilities of the speech-enabled device 102, e.g., a basic text-to-speech capability, and may synthesize the audible utterance to the user from speech output generated by the dumb device 104A or the speech-enabled device 102. The conversation logic state and/or the speech input may be exchanged between the speech-enabled device 102 and/or the dumb device 104A, as appropriate, via the shared data channel 212, as denoted at 222, and/or via the shared integration language channel 214, as denoted at 224. The speech output and/or the audible utterance may include a request for a response, e.g., a confirmation, from the user. The user may provide confirmation in response to the audible utterance, e.g., as a second spoken utterance, which may be converted to a second speech input by the speech-enabled device 102. The speech-enabled device 102 may map the second speech input to a second conversation logic state and may send the second conversation logic state to the dumb device 104A, e.g., via the shared data channel 212 as denoted at 222. The dumb device 104A may then complete execution of the command to perform the corresponding function, and/or a third conversation logic state may be returned if there is at least one other intermediate step.

In an implementation, one or more of the dumb devices 104 and/or the speech-enabled device 102 may proactively initiate a command based on sensor data and an internal trigger mechanism and can initiate a speech dialog with the user for execution. For example, in the illustrated implementation of FIG. 2, the speech-enabled device 102 may initiate a command for itself or one or more of the dumb devices 104A based on sensor data from the sensor 138 and an internal trigger mechanism of the speech-enabled device and may initiate a speech dialog with the user for execution of the command by to perform a corresponding function.

In an implementation, one or more of the dumb devices 104 and/or the speech-enabled device 102 may automatically estimate parameters of the command execution based on user data to reduce interactions in speech dialog with the user. As one example, the user data may be stored, e.g., in the storage 136 of FIG. 1, and may include one or more payment accounts (e.g., credit card accounts, checking accounts, etc.) associated with the user. The user data may additionally include historical data indicating which payment accounts are typically used by the user and/or which are used for particular types of purchases. For instance, the user data may indicate that the user has first and second payment accounts and that the user typically uses the first payment account to pay for parking and the second payment account to pay for purchases at vending machines. Accordingly, if the dumb device 104 is a parking meter or a vending machine, the speech-enabled device 102 may estimate which of the payment accounts the user may use to pay for parking or to purchase something from the vending machine. In the absence of estimation, the speech-enabled device 102 may first ask the user whether the user would like to pay for parking (or make a purchase from the vending machine) and, in response to a "yes" from the user, then ask the user which payment account the user would like to pay with. In contrast, by estimating the payment account in advance, the two questions may be condensed to one by the speech-enabled device asking the user whether the user would like to pay for parking (or make a purchase from the vending machine) using the first (or the second) payment account.

Although not illustrated in FIG. 2, the command bus 202 may additionally include a de-registration channel. The de-registration channel may be used by the dumb device 104 to send the speech-enabled device 102 a message indicating that the dumb device 104 is leaving the corresponding ad hoc network. The message may indicate or request de-registration of the speech dialog data of the dumb device 104 that sends the message. In response to receiving such a message or to timeout of a particular duration of time or to determining that the dumb device 104 has left the corresponding ad hoc network, the speech-enabled device 102 may delete the speech dialog data of the corresponding dumb device 104 from its storage.

In some implementations, the dumb device 104 may register updated speech dialog data, or particularly speech processing data, with the speech-enabled device 102 depending on time synchronicity data, classification of context, or other factors or criteria. The time synchronicity data can be data used to synchronize a device time with a universal time. For example, the time synchronicity data can be configured to synchronize a local time associated with the dumb device 104 or the speech-enabled device 102 with a universal time. In some implementations, a local time may be synchronized with the Coordinated Universal Time (UTC) defined by International Telecommunications Union Recommendation (ITU-R TF.460-6) according to a corresponding local time zone. In some other implementations, a local time may be synchronized by timekeeping technologies including GPS satellites and a network time protocol (NTP). The network time protocol may include a networking protocol for clock synchronization between computer systems over packet-switched variable-latency data networks. As an example, consider the speech-enabled device 102 implemented as a vehicle that is parked (e.g., by the user 114) regularly on a street that has the dumb device 104A implemented as a parking meter. Responsive to a new parking enforcement coming into effect on a particular day and at a particular time, speech dialog data of the dumb device 104A may be updated on the dumb device 104A at any time, including before, at, or after the particular day and time. Responsive to the dumb device 104A and the speech-enabled device 102 forming the ad hoc network 112A after the particular day and time as indicated by time synchronicity data, the dumb device 104A may register its updated speech dialog with the speech-enabled device 102.

In some implementations, authentication may be performed between the speech-enabled device 102 and one or more of the dumb devices 104. The authentication may be performed prior to the speech-enabled device 102 receiving speech dialog data of the dumb device 104. The authentication may determine whether the speech dialog data of the dumb device 104 is in the shared integration language that is common to the speech dialog data of the speech-enabled device 102, or whether the dumb device 104 is authorized for sharing speech dialog capabilities of the speech-enabled device 102.

In some implementations, speech processing data of the speech-enabled device 102 and/or of the dumb devices 104 may be updated for each of multiple users. For instance, the speech processing data may be updated for a particular user based on prior dialog with the particular user to improve speech recognition and interpretation of user dialog from the particular user. The user-specific updates may be stored in user profiles for the corresponding users and apart from the speech processing data.

In some implementations, the commands to be executed can be represented using a hierarchical structure. The hierarchical structure may be used by the speech-enabled device 102 that interprets the corresponding speech input and associated command for the delegation of sub-commands to different dumb devices 104. The speech-enabled device that receives the initiating speech input can identify the sub-commands that need to be executed using the speech processing data and the hierarchical structure. Based on the hierarchical structure and the registration of the dumb devices 104, the speech-enabled device 102 can delegate the sub-commands to dumb devices 104 that can fulfill the commands (e.g., the dumb devices 104 that have the commands in their portfolio).

Example Speech Dialog Module

Figure 3:
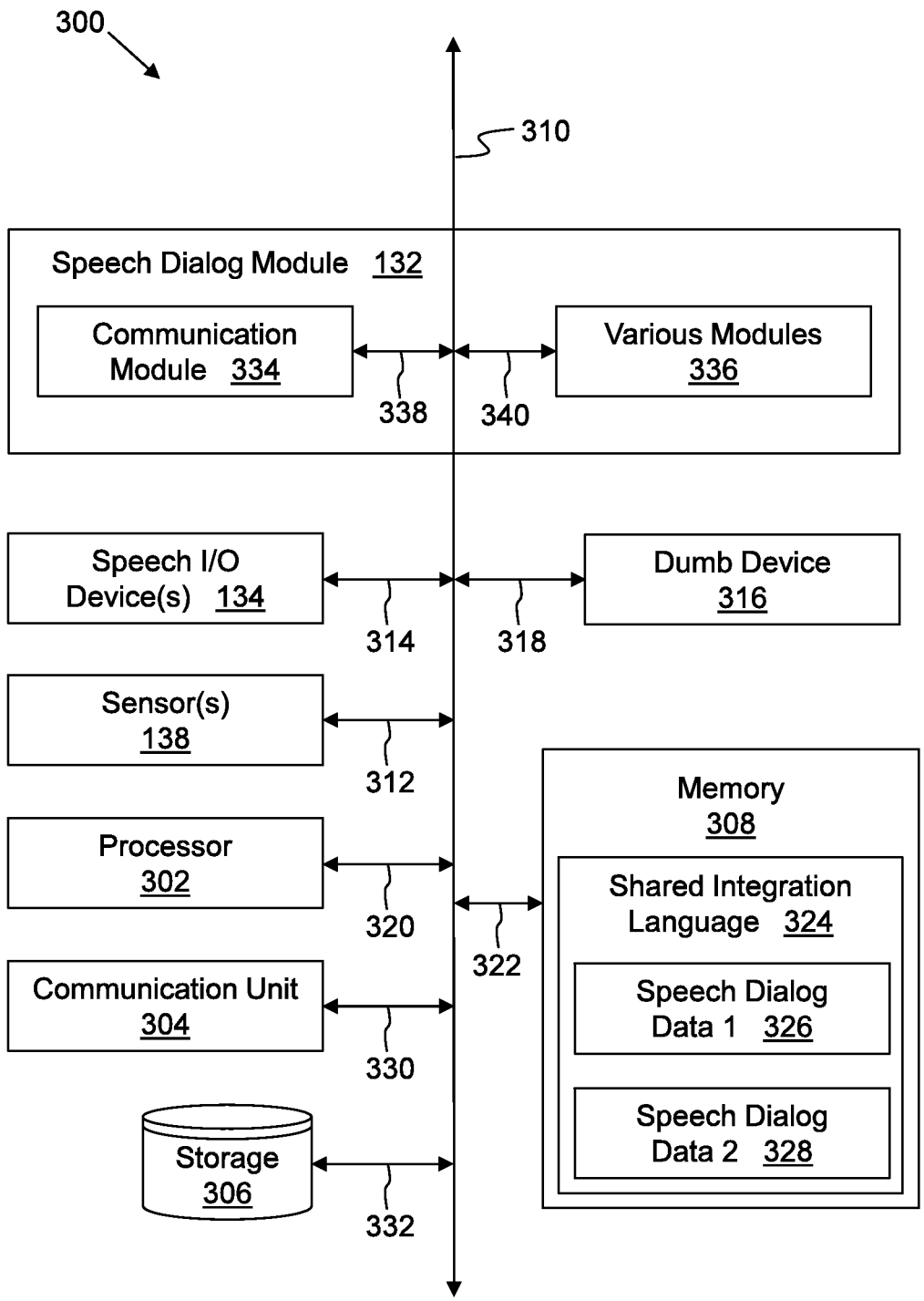
FIG. 3 is a block diagram illustrating an example computing device that includes an example speech dialog module.

FIG. 3 is a block diagram illustrating an example computing device 300 that includes an implementation of the speech dialog module 132 of FIGS. 1 and 2. The computing device 300 includes the speech dialog module 132, a processor 302, a communication unit 304, a storage 306, and a memory 308 according to some examples. The components of the computing device 300 are communicatively coupled by a bus 310. The bus 310 may include, but is not limited to, a controller area network (CAN) bus, a memory bus, a storage interface bus, a bus/interface controller, an interface bus, or the like or any combination thereof. In some implementations, the computing device 300 additionally includes the sensors 138 coupled to the bus 310 via a signal line 312, the speech I/O devices 134 coupled to the bus 310 via a signal line 314, and a dumb device 316 coupled to the bus 310 via a signal line 318. Additionally or alternatively, the computing device 300 can be the speech-enabled device 102.

The dumb device 316 may correspond to one or more of the dumb devices 104 discussed previously and the description of the dumb devices 104 above may generally apply to the dumb device 316, which will not be described in further detail. The sensors 138 and the speech I/O devices 134 have been described previously.

The processor 302 includes an arithmetic logic unit, a microprocessor, a general-purpose controller, or some other processor array to perform computations and provide electronic display signals to a display device. The processor 302 is coupled to the bus 310 for communication with the other components via a signal line 320. The processor 302 processes data signals and may include various computing architectures including a complex instruction set computer (CISC) architecture, a reduced instruction set computer (RISC) architecture, or an architecture implementing a combination of instruction sets. Although FIG. 3 includes a single processor 302, multiple processors 302 may be included. Other processors, operating systems, sensors, displays, and physical configurations may be possible.

The memory 308 stores instructions or data that may be executed by the processor 302. The memory 308 is coupled to the bus 310 for communication with the other components via a signal line 322. The instructions or data may include code for performing the techniques described herein. The memory 308 may be a dynamic random access memory (DRAM) device, a static random access memory (SRAM) device, flash memory, or some other memory device. In some implementations, the memory 308 also includes a non-volatile memory or similar permanent storage and media including a hard disk drive, a floppy disk drive, a CD-ROM device, a DVD-ROM device, a DVD-RAM device, a DVD-RW device, a flash memory device, or some other mass storage for storing information on a more permanent basis.

As illustrated in FIG. 3, the memory 308 stores a shared integration language 324. The shared integration language 324 may include first and second speech dialog data 326 and 328. The first speech dialog data 326 may include speech dialog data associated with commands and/or functions of the computing device 300, which may be implemented as the speech-enabled device 102. The second speech dialog data 328 may include speech dialog data received from the dumb device 316 and/or associated with commands and/or functions of the dumb device 316.

The communication unit 304 transmits and receives data to and from at least one of the speech-enabled device 102, the dumb device 104, and any other entities of the system 100 of FIG. 1. The communication unit 304 is coupled to the bus 310 via a signal line 330. In some implementations, the communication unit 304 includes a port for direct physical connection to the network 110 of FIG. 1 or to another communication channel. For example, the communication unit 304 may include a universal serial bus (USB) port, a secure digital (SD) port, a category 5 cable (CAT-5) port, or similar port for wired communication with the speech-enabled device 102 or the dumb device 104. In some implementations, the communication unit 304 includes a wireless transceiver for exchanging data with at least one of the speech-enabled device 102, the dumb device 104, and any other entities of the system 100 of FIG. 1 or other communication channels using one or more wireless communication methods, including IEEE 802.11, IEEE 802.16, BLUETOOTH®, or another suitable wireless communication method.

In some implementations, the communication unit 304 includes a cellular communications transceiver for sending and receiving data over a cellular communications network including via SMS, MMS, HTTP, direct data connection, WAP, e-mail, or another suitable type of electronic communication. In some implementations, the communication unit 304 includes a wired port and a wireless transceiver. The communication unit 304 also provides other conventional connections to the network 110 of FIG. 1 for distribution of files or media objects using standard network protocols including transmission control protocol/internet protocol (TCP/IP), HTTP, HTTP secure (HTTPS), and simple mail transfer protocol (SMTP), etc.

The storage 306 can be a non-transitory storage medium that stores data for providing the functionality described herein. The storage 306 may correspond to or be an example of the storage 118 and/or the storage 136 of FIG. 1. The storage 306 may be a dynamic random access memory (DRAM) device, a static random access memory (SRAM) device, flash memory, or some other memory devices. In some implementations, the storage 306 also includes a non-volatile memory or similar permanent storage and media including a hard disk drive, a floppy disk drive, a CD-ROM device, a DVD-ROM device, a DVD-RAM device, a DVD-RW device, a flash memory device, or some other mass storage for storing information on a more permanent basis. The storage 306 is communicatively coupled to the bus 310 via a signal line 332. The storage 306 may also store data that was temporarily stored in the memory 308.

In the illustrated implementation of FIG. 3, the speech dialog module 132 includes a communication module 334 and one or more other modules 336 (labeled "Various Modules 336" in FIG. 3 and referred to as module 336 or modules 336). The components of the speech dialog module 132 are communicatively coupled to the bus 310. For example, the communication module 334 is communicatively coupled to the bus 310 via a signal line 338. The modules 336 are communicatively coupled to the bus 310 via signal lines 340.

The communication module 334 can be software including routines for handling communications between the modules 336 and other components of the computing device 300. The communication module 334 sends and receives data, via the communication unit 304, to and from one or more of the speech-enabled device 102, the dumb device 104, and/or other entities of the system 100 of FIG. 1 depending upon where the speech dialog module 132 is stored. In some implementations, the communication module 334 receives data from one or more of the modules 336 and stores the data in one or more of the storage 306 and the memory 308. In some implementations, the communication module 334 retrieves data from the storage 306 or the memory 308 and sends the data to one or more of the modules 336.

Figure 4:
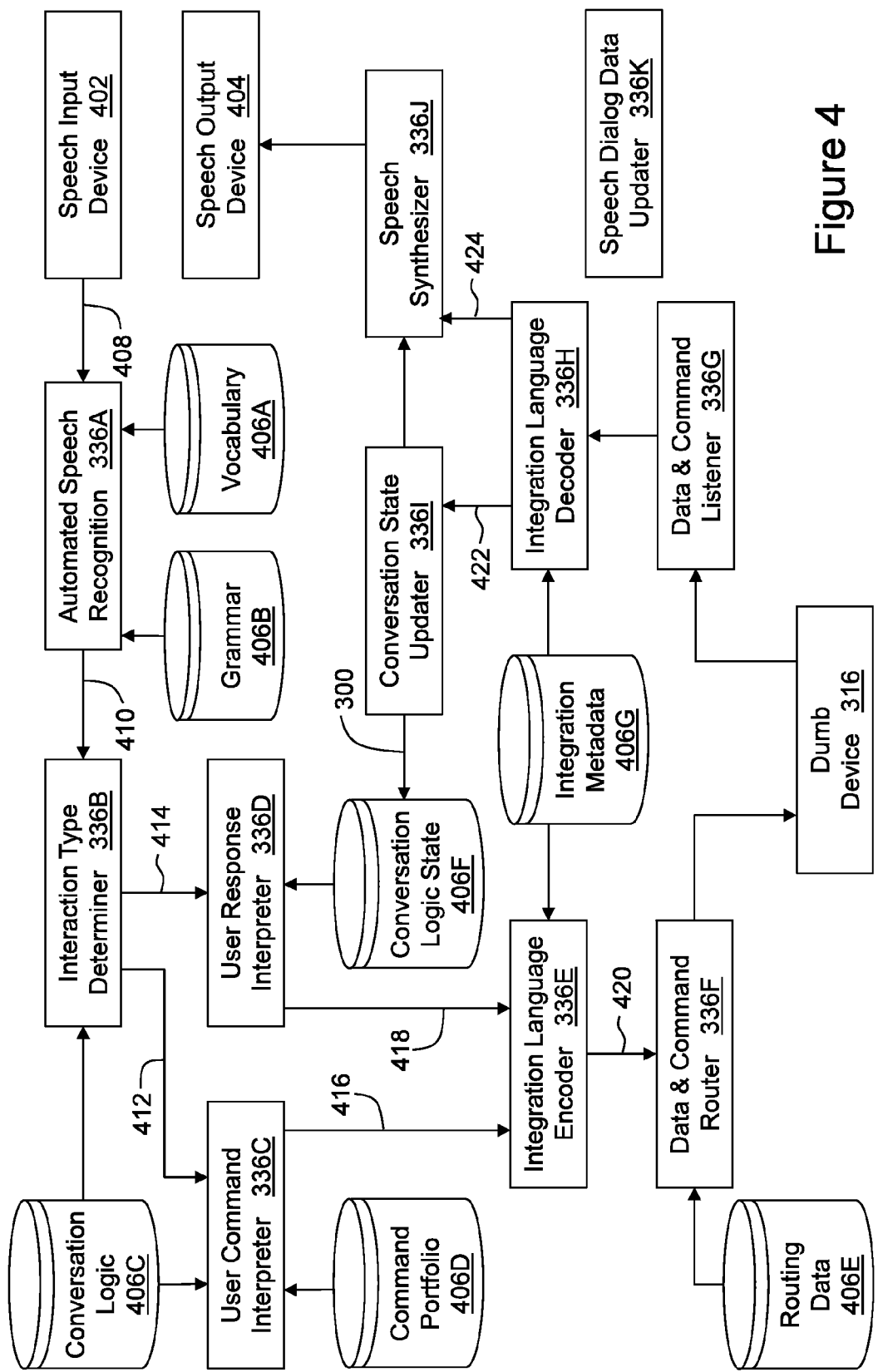
FIG. 4 is a block diagram illustrating various modules that may be included in the speech dialog module of FIG. 3.

Examples of the modules 336 are illustrated in and described in more detail with respect to FIG. 4. Each of the modules 336 can be software including routines for sharing speech dialog capabilities including performing the operations as described in herein. For example, in some implementations, the modules 336 may receive speech dialog data of the dumb device 316 that indicates a function of the dumb device 316, store the received speech dialog data of the dumb device 316 in the memory 308 and/or the storage 306 (e.g., as the second speech dialog data 328), receive speech input, determine the function of the dumb device to be invoked based on the speech input using the speech dialog data, generate a command effective to invoke the function of the dumb device based on the speech dialog data, and send the command to the dumb device 316 to invoke the function of the dumb device 316. The modules 336 may alternatively or additionally perform other operations described herein.

FIG. 4 is a block diagram illustrating the various modules 336 that may be included in the speech dialog module 132 of FIG. 3. The modules 336 include modules 336A-336K. FIG. 4 additionally illustrates the dumb device 316, a speech input device 402, a speech output device 404, and shared speech dialog data 406A-406G.

The modules 336 illustrated in FIG. 4 can be software including routines for sharing speech dialogue capabilities including performing the operations as described herein. The modules 336 include automated speech recognition 336A, interaction type determiner 336B, user command interpreter 336C, user response interpreter 336D, integration language encoder 336E, data and command router 336F, data and command listener 336G, integration language decoder 336H, conversation state updater 336I, speech synthesizer 336J, and speech dialog data updater 336K.

The speech input device 402 and the speech output device 404 are examples of the speech I/O devices 134. The speech input device 402 may be communicatively coupled to the processor 302 of FIG. 3 (e.g., via the bus 310) and may include a speech-to-digital data transducer configured to generate speech input as a digital data representation of a spoken utterance of a user. The speech output device 404 may be communicatively coupled to the processor 302 of FIG. 3 (e.g., via the bus 310) and may include a digital data-to-speech transducer configured to convert speech output to an audible utterance.

The shared speech dialog data 406A-406G may correspond to the first and second speech dialog data 326 and 328 of FIG. 3. FIG. 3 illustrates the first and second speech dialog data 326 and 328 as being separated, at least logically. In comparison, FIG. 4 illustrates different types of shared speech dialog data 406A-406G that may be used by the modules 336. Each of the different types of shared speech dialog data 406A-406G may include speech dialog data of a speech-enabled device as well as one or more dumb devices (including the dumb device 316). The shared speech dialog data 406A-406G may include vocabulary 406A, grammar 406B, conversation logic 406C, a command portfolio 406D, routing data 406E, conversation logic state 406F, and integration metadata 406G.

In some implementations, the modules 336 and other components illustrated in FIGS. 3 and 4 may operate as follows. The communication module 334 establishes, via the communication unit 304, an ad hoc network that includes a communication bus, e.g., the communication bus 200 of FIG. 2, with the dumb device 316. The dumb device 316 provides its speech dialog data to the computing device 300 implemented as a speech-enabled device, and the speech dialog data updated 336K updates the shared speech dialog data 406A-406G to include the speech dialog data received from the dumb device 316. A user utters a command or other spoken utterance, and the speech input device 402 generates speech input 408 that is provided to the automated speech recognition 336A as a digital data representation of the spoken utterance of the user.

Based on the vocabulary 406A and the grammar 406B, the automated speech recognition 336A may generate recognized utterance data 410 indicating a word or words recognized in the speech input 408. Based on the conversation logic 406C and the recognized utterance data 410, the interaction type determiner 336B determines whether the spoken utterance of the user includes a new command 412 or user response data 414 (e.g., a confirmation) requested from the user.

If the interaction type determiner 336B determines that the spoken utterance of the user includes the new command 412, the user command interpreter 336C may interpret the new command 412 as invoking a function of a device, e.g., the dumb device 316, based on the conversation logic 406C and the command portfolio 406D and may generate a command execution control signal and associated data 416. For example, if the new command 412 is interpreted as invoking a function of the dumb device 316, the command portfolio 406D may indicate the corresponding command to send to the dumb device 316 and the conversation logic 406C may indicate the data to send with the command, which may be provided to the integration language encoder 336E as the command execution control signal and associated data 416.

On the other hand, if the interaction type determiner 336B determines that the spoken utterance of the user includes user response data 414, the user response interpreter 336D may interpret user response data 414 in view of a current conversation logic state indicated by the conversation logic state 406F. For example, the user response interpreter may map the user response data 414 to a conversation logic state 418 that is subsequent to the current logic state indicated by the conversation logic state 406F. The user response interpreter 336D may provide the conversation logic state 418 to the integration language encoder 336E.

The integration language encoder 336E receives the command execution control signal and associated data 416 or the conversation logic state 418 and encodes it as a command and/or conversation logic state 420 according to or consistent with the integration metadata 406G (or shared integration language) so that it may be understood by other devices that use the shared integration language, e.g., the dumb device 316. The data and command router 336F receives and routes or sends the command and/or conversation logic state 420 to the corresponding dumb device 316 according to the routing data 406E.

The dumb device 316 may in some instances request additional data from the computing device 300 implemented as the speech-enabled device, may proactively initiate functions and/or commands, and/or may return a result of command execution. Accordingly, the data and command listener 336G may listen for requests, commands, and/or results from the dumb device 316 and may forward them to the integration language decoder 336H.

The integration language decoder 336H decodes each request, command, and/or result received from the dumb device 316 according to or consistent with the integration metadata 406G (or shared integration language) so that it may be understood by the computing device 300 implemented as the speech-enabled device. In some implementations, the integration language decoder 336H may, based on the request, command, and/or result received from the dumb device 316 and the integration metadata 406G, provide a conversation logic state of interaction with the user 422 to the conversation state updater 336I. Additionally or alternatively, and based on the request, command, and/or result received from the dumb device 316 and the integration metadata 406G, the integration language decoder 336H may provide a result of command execution 424 to the speech synthesizer 336J.

The conversation state updater 336I may update the conversation logic state 406F to, e.g., indicate a new current conversation logic state based on the conversation logic state of interaction with the user 422 received from the integration language decoder 336H. Additionally or alternatively, the speech synthesizer 336J together with the speech output device 404 may convert the new conversation logic state provided by the conversation state updater 336I and/or the result of command execution 424 to speech output which may be synthesized as an audible utterance to the user to request confirmation or other input from the user (e.g., in the case of the new conversation logic state requesting confirmation or other input) and/or to report results of command execution by the dumb device 316 (e.g., in the case of the speech synthesizer 336J receiving the result of command execution 424).

Methods

Figure 5:
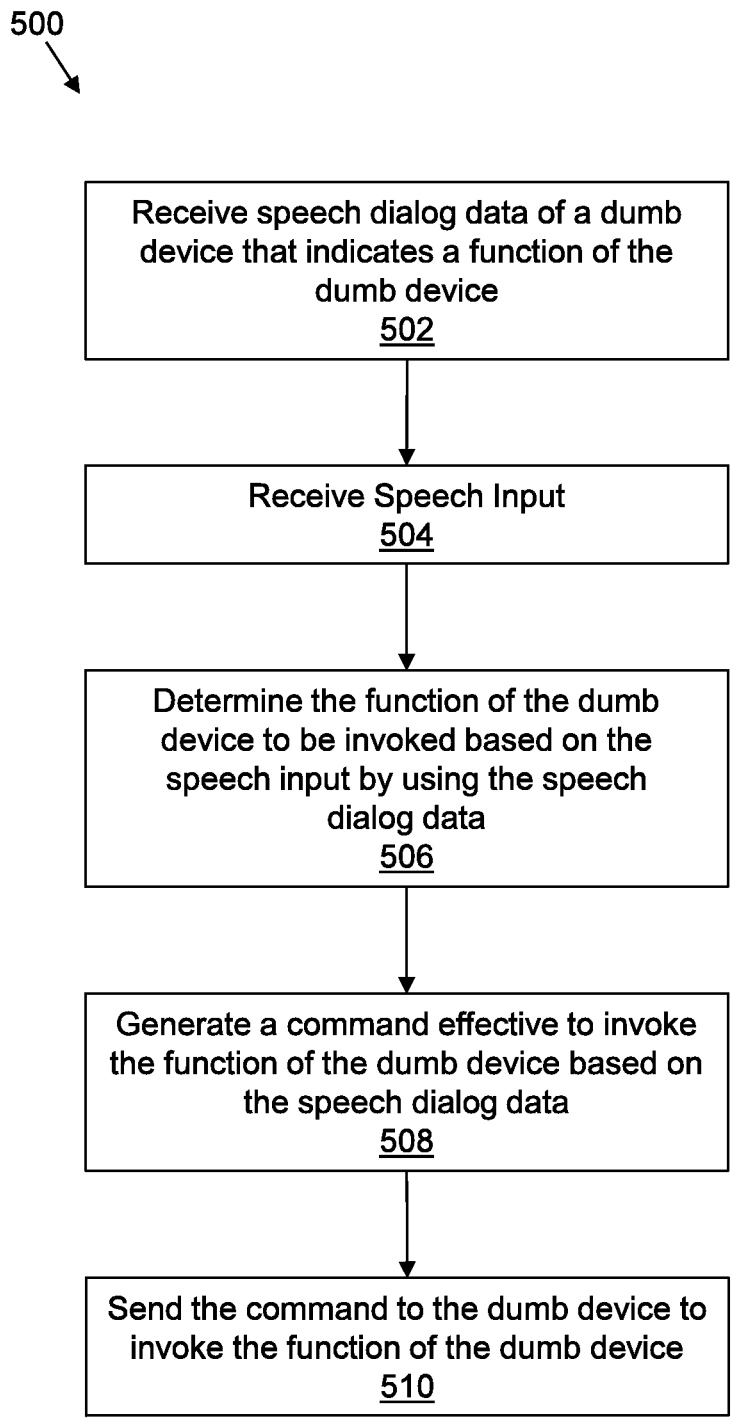
FIG. 5 is a flowchart of an example method to share speech dialog capabilities of a speech-enabled device with a dumb device.

FIG. 5 is a flowchart of an example method 500 to share speech dialog capabilities of a speech-enabled device with a dumb device. The method 500 may be implemented, in whole or in part, by the speech-enabled device 102 of FIGS. 1-2, the computing device 300 of FIG. 3, or another suitable device or system. For this and other processes and methods disclosed herein, the operations performed in the processes and methods may be implemented in differing order. Furthermore, the outlined operations are only provided as examples, and some of the operations may be optional, combined into fewer operations, supplemented with other operations, or expanded into additional operations without detracting from the essence of the disclosed implementations.

In some implementations, the method 500 includes receiving 502 speech dialog data of a dumb device that indicates a function of the dumb device. The method 500 also includes receiving 504 speech input. The method 500 also includes determining 506 the function of the dumb device to be invoked based on the speech input by using the speech dialog data of the dumb device. The method 500 also includes generating 508 a command effective to invoke the function of the dumb device based on the speech dialog data. The method 500 also includes sending 510 the command to the dumb device to invoke the function of the dumb device.

The speech dialog data may indicate the command effective to invoke the function and may include speech processing data for a speech-enabled device to recognize and interpret speech input relevant to the dumb device. The speech processing data may include vocabulary, grammar, and conversation logic associated with the command. The vocabulary may include one or more terms of speech input and/or speech output associated with invocation of the command. The grammar may include a set of rules that constrain word sequence and sentence structure of the one or more terms of speech input and/or speech output. The conversation logic may define intermediate conversation logic states associated with the command.

Although not illustrated in FIG. 5, the method 500 may include one or more other steps or operations. For example, the method 500 may include determining updates to the speech processing data that are specific to a user that provides the speech input; and recording the updates to the speech processing data.

In some implementations, the speech input includes first speech input received at a first time and second speech input received at a second time. The method 500 may further include determining, based on the speech dialog data and the first speech input, a conversation logic state after receiving the first speech input and prior to receiving the second speech input. The conversation logic state may be converted to speech output. The speech output may be synthesized, by a speech-enabled device, as an audible utterance. The speech output synthesized as the audible utterance may include a request for a response from a user. The second speech input may include the response from the user.

The conversation logic state may include a first conversation logic state and the method 500 may further include mapping, based on the speech dialog data, the second speech input to a second conversation logic state. The method 500 may further include sending the second conversation logic state to the dumb device, where the dumb device is configured to initiate execution of the command to initiate performance of the function based on a conversation logic state corresponding to the first speech input and is configured to continue or complete execution of the command to continue or complete performance of the function based on the second conversation logic state. The second conversation logic state may include a confirmation from the user.

Additionally or alternatively, the method 500 may further include, prior to receiving the speech input, receiving a request from the dumb device to initiate a speech dialog with a user to determine whether the user wants to invoke the function of the dumb device; determining, based on the speech dialog data and the received request, a conversation logic state; converting the conversation logic state to speech output; and synthesizing, by the speech-enabled device, the speech output as an audible utterance to the user. The audible utterance may include a request for input from the user regarding invocation of the function. The speech input may include input from the user that confirms or requests invocation of the function.

Additionally or alternatively, the method 500 may also include estimating parameters associated with one or both of execution of the command or performance of the function based on a user profile of a user from which the speech input is received. The method 500 may also include sending the estimated parameters to the dumb device, where the dumb device is configured to execute the command and/or perform the function based on the estimated parameters.

Additionally or alternatively, the method 500 may further include establishing an ad hoc communication network between the dumb device and the speech-enabled device prior to the speech-enabled device receiving the speech dialog data of the dumb device. The method 500 may also include, responsive to determining that the dumb device terminated a connection to the ad hoc communication network or to the speech-enabled device receiving a request to de-register the dumb device, deleting the speech dialog data of the dumb device from the speech-enabled device.

Additionally or alternatively, the method 500 may further include performing an authentication between the dumb device and the speech-enabled device prior to the speech-enabled device receiving the speech dialog data of the dumb device. The method 500 may further include, responsive to the authentication indicating at least that the speech dialog data of the dumb device is in a shared integration language that is common to speech dialog data of the speech-enabled device, establishing an ad hoc communication network between the dumb device and the speech-enabled device to communicate the speech dialog data of the dumb device to the speech-enabled device.

Additionally or alternatively, the method 500 may further include the speech-enabled device receiving speech dialog data from multiple dumb devices. The method 500 may further include the speech-enabled device identifying a corresponding one of the multiple dumb devices whose function is to be invoked and determining the function of the corresponding one of the dumb devices to be invoked based on the speech input by using the speech dialog data. The method 500 may further include generating a command effective to invoke the function of the corresponding one of the multiple dumb devices based on the speech dialog data. The method 500 may further including sending the command to the corresponding one of the multiple dumb devices to invoke the function of the corresponding one of the multiple dumb devices.

Some implementations disclosed herein include a computer program product including a non-transitory computer-usable medium that includes a computer-readable program. Execution of the computer-readable program on a computer may cause the computer to perform or may cause the computer to control performance of the method 500 and/or variations thereof. The non-transitory computer-usable medium may include, for example, the storage 136 of FIG. 1, the memory 308 of FIG. 3, and/or the storage 306 of FIG. 3. The computer-readable program may include, for example, the speech dialog module 132 of FIGS. 1-3 and/or the modules 336 of FIGS. 3-4. The computer may include, for example, the computing device 300 of FIG. 3.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computing device that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present implementations of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some preferred implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method for a vehicle to enable a user to provide voice commands to a dumb device that is not configured to recognize any voice commands included in a specified set of voice commands, the method comprising:
   discovering, by a speech-enabled device, a dumb device, wherein the speech-enabled device is an onboard computer of a vehicle that is configured to recognize a specified set of voice commands and the dumb device is a processor-based device that is not configured to recognize the specified set of voice commands;
   receiving, by the speech-enabled device, speech dialog data of the dumb device that indicates one or more functions of the dumb device, wherein the speech dialog data includes a command portfolio of the dumb device and speech processing data that includes speech recognition data configured to enable the dumb device to recognize speech and interpret user dialog, wherein the speech recognition data describes one or more voice commands that are recognizable by the dumb device;
   determining, by the speech-enabled device, that the dumb device is not configured to recognize the specified set of voice commands based on analysis of the speech dialog data;
   receiving, by the speech-enabled device, a speech input that verbally indicates a function to be invoked by the dumb device, wherein the speech input includes a voice command included in the specified set of voice commands that the dumb device is not configured to recognize and the voice command verbally indicates the function to be invoked by the dumb device;
   determining, by the speech-enabled device, the function of the dumb device to be invoked based on the speech input;
   determining, by the speech-enabled device, that the dumb device is not configured to recognize the voice command included in the speech input;
   analyzing, by the speech-enabled device, the speech dialog data and the speech input to generate a dumb device command that is effective to cause the dumb device to provide the function indicated by the speech input so that the dumb device operates as if it recognized the voice command included in the specified set of voice commands that the dumb device is not configured to recognize; and
   providing, by the speech-enabled device, the dumb device command to the dumb device so that the dumb device provides the function indicated by speech input and operates as if it recognized the voice command included in the specified set of voice commands that the dumb device is not configured to recognize.

2. The method of claim 1, wherein the speech dialog data indicates the dumb device command and includes speech processing data for the speech-enabled device to recognize and interpret speech input relevant to the dumb device, wherein the speech-enabled device incudes a processor-based device that is configured to recognize any voice commands included in the specified set of voice commands.

3. The method of claim 2, wherein:
the speech processing data includes vocabulary, grammar, and conversation logic associated with the dumb device command;
the vocabulary includes one or more terms of speech input and/or speech output associated with invocation of the dumb device command;
the grammar includes a set of rules that constrain word sequence and sentence structure of the one or more terms of speech input and/or speech output; and
the conversation logic defines intermediate conversation logic states associated with the dumb device command.

4. The method of claim 2, further comprising:
determining updates to the speech processing data that are specific to a user that provides the speech input; and
recording the updates to the speech processing data.

5. The method of claim 1, wherein the speech input comprises first speech input received at a first time and second speech input received at a second time, the method further comprising:
determining, based on the speech dialog data and the first speech input, a conversation logic state after receiving the first speech input and prior to receiving the second speech input;
converting the conversation logic state to speech output; and
synthesizing, by the speech-enabled device, the speech output as an audible utterance,
wherein:
the speech output synthesized as the audible utterance comprises a request for a response from a user; and
the second speech input includes the response from the user.

6. The method of claim 5, wherein the conversation logic state comprises a first conversation logic state, the method further comprising:
mapping, based on the speech dialog data, the second speech input to a second conversation logic state; and
sending the second conversation logic state to the dumb device, wherein the dumb device is configured to initiate execution of the dumb device command to initiate performance of the function based on a conversation logic state corresponding to the first speech input and is configured to continue or complete execution of the dumb device command to continue or complete performance of the function based on the second conversation logic state.

7. The method of claim 6, wherein the second conversation logic state comprises a confirmation from the user.

8. The method of claim 1, further comprising, prior to receiving the speech input:
receiving a request from the dumb device to initiate a speech dialog with a user to determine whether the user wants to invoke the function of the dumb device;
determining, based on the speech dialog data and the received request, a conversation logic state;
converting the conversation logic state to speech output; and
synthesizing, by the speech-enabled device, the speech output as an audible utterance to the user,
wherein:
the audible utterance comprises a request for input from the user regarding invocation of the function; and
the speech input includes input from the user that confirms or requests invocation of the function.

9. The method of claim 1, further comprising:
estimating parameters associated with one or both of execution of the dumb device command or performance of the function based on a user profile of a user from which the speech input is received; and
sending the estimated parameters to the dumb device, wherein the dumb device is configured to execute the dumb device command and/or perform the function based on the estimated parameters.

10. The method of claim 1, further comprising:
establishing an ad hoc communication network between the dumb device and the speech-enabled device prior to the speech-enabled device receiving the speech dialog data of the dumb device;
responsive to determining that the dumb device terminated a connection to the ad hoc communication network or to the speech-enabled device receiving a request to de-register the dumb device, deleting the speech dialog data of the dumb device from the speech-enabled device.

11. The method of claim 1, further comprising:
performing an authentication between the dumb device and the speech-enabled device prior to the speech-enabled device receiving the speech dialog data of the dumb device; and
responsive to the authentication indicating at least that the speech dialog data of the dumb device is in a shared integration language that is common to speech dialog data of the speech-enabled device, establishing an ad hoc communication network between the dumb device and the speech-enabled device to communicate the speech dialog data of the dumb device to the speech-enabled device.

12. The method of claim 1, further comprising:
the speech-enabled device receiving speech dialog data from a plurality of dumb devices;
the speech-enabled device identifying a corresponding one of the plurality of dumb devices whose function is to be invoked and determining the function of the corresponding one of the plurality of dumb devices to be invoked based on the speech input by using the speech dialog data;
generating a command effective to invoke the function of the corresponding one of the plurality of dumb devices based on the speech dialog data; and
sending the command to the corresponding one of the plurality of dumb devices to invoke the function of the corresponding one of the plurality of dumb devices.

13. A speech-enabled device for a vehicle to enable a user to provide voice commands to a dumb device that is not configured to recognize any voice commands included in a specified set of voice commands, the speech-enabled device comprising:
a processor of an onboard computer of a vehicle, wherein the speech-enabled device includes the onboard computer of the vehicle and the onboard computer of the vehicle is configured to recognize a specified set of voice commands; and
a memory communicatively coupled to the processor, the memory storing instructions that, when executed by the processor, cause the speech-enabled device to:
discover a dumb device, wherein the dumb device is a processor-based device that is not configured to recognize the specified set of voice commands that is recognizable to the onboard computer of the vehicle;
establish a wireless network with the dumb device;
receive speech dialog data of the dumb device that indicates a function of the dumb device;

determining that the dumb device is not configured to recognize the specified set of commands based on analysis of the speech dialog data;

receive speech input that verbally indicates a function to be invoked by the dumb device, wherein the speech input includes a voice command included in the specified set of voice commands that the dumb device is not configured to recognize and the voice command verbally indicates the function to be invoked by the dumb device;

determine the function of the dumb device to be invoked based on the speech input by using the speech dialog data;

generate, based on the speech dialog data, a dumb device command that is effective to cause the dumb device to provide the function indicated by the speech input so that the dumb device operates as if it recognized the voice command included in the specified set of voice commands that the dumb device is not configured to recognize; and providing, via the wireless network established with the dumb device, the dumb device command to the dumb device, wherein responsive to receiving the dumb device command via the wireless network the dumb device executes the dumb device command and the dumb device command causes the dumb device to operate as if it recognized the voice command included in the specified set of voice commands that the dumb device is not configured to recognize.

14. The speech-enabled device of claim 13, further comprising:

a speech input device communicatively coupled to the processor and comprising a speech-to-digital data transducer configured to generate the speech input as a digital data representation of a spoken utterance of a user; and a speech output device communicatively coupled to the processor and comprising a digital data-to-speech transducer configured to convert speech output to an audible utterance.

15. The speech-enabled device of claim 13, wherein the speech input comprises first speech input received at a first time and second speech input received at a second time and wherein the memory further stores instructions that, when executed by the processor, cause the speech-enabled device to:

determine, based on the speech dialog data and the first speech input, a conversation logic state after receiving the first speech input and prior to receiving the second speech input;

convert the conversation logic state to an utterance; and synthesize, by the speech-enabled device, the utterance as speech output, wherein:
the utterance synthesized as speech output requests a response from a user; and
the second speech input includes the response from the user.

16. A computer program product of a vehicle to enable a user to provide voice commands to a dumb device that is not configured to recognize any voice commands included in a specified set of voice commands, the computer program product comprising a non-transitory computer-usable medium including a computer-readable program, wherein the computer-readable program when executed on an onboard computer of the vehicle causes the computer to:

discover a dumb device, wherein the onboard computer of the vehicle is a speech-enabled device that is configured to recognize a specified set of voice commands and the dumb device is a processor-based device that is not configured to recognize the specified set of voice commands that are recognized by the onboard compute of the vehicle;

receive speech dialog data of the dumb device that indicates a function of the dumb device, wherein the speech dialog data includes a command portfolio of the dumb device and speech processing data that includes speech recognition data configured to enable the dumb device to recognize speech and interpret user dialog, wherein the speech recognition data describes one or more voice commands that are recognizable by the dumb device;

determine that the dumb device is not configured to recognize the specified set of voice commands based on analysis of the speech dialog data;

receive speech input that verbally indicates a function to be invoked by the dumb device, wherein the speech input includes a voice command included in the specified set of voice commands that the dumb device is not configured to recognize and the voice command verbally indicates the function to be invoked by the dumb device;

determine the function of the dumb device to be invoked based on the speech input by using the speech dialog data;

determine that the dumb device is not configured to recognize the voice command included in the speech input;

analyzing the speech dialog data and the speech input to generate a dumb device command that is effective to cause the dumb device to provide the function indicated by the speech input so that the dumb device operates as if it recognized the voice command included in the specified set of voice commands that the dumb device is not configured to recognize; and providing the dumb device command to the dumb device so that the dumb device provides the function indicated by speech input and operates as if it recognized the voice command included in the specified set of voice commands that the dumb device is not configured to recognize.

17. The computer program product of claim 16, wherein the computer-readable program when executed on the computer further causes the computer to, prior to receipt of the speech input:

receive a request from the dumb device to initiate a speech dialog with a user to determine whether the user wants to invoke the function of the dumb device;

determine, based on the speech dialog data and the received request, a conversation logic state;

convert the conversation logic state to speech output; and synthesize, by a speech-enabled device, the speech output as an audible utterance to the user, wherein:
the audible utterance comprises a request for input from the user regarding invocation of the function; and
the speech input includes input from the user that confirms or requests invocation of the function.

18. The computer program product of claim 16, wherein the computer-readable program when executed on the computer further causes the computer to:

estimate parameters associated with one or both of execution of the command or performance of the function based on a user profile of a user from which the speech input is received; and send the estimated parameters to the dumb device, wherein the dumb device is configured to execute the command and/or perform the function based on the estimated parameters.

19. The computer program product of claim 16, wherein the computer-readable program when executed on the computer further causes the computer to:

establish an ad hoc communication network between the dumb device and a speech-enabled device prior to the speech-enabled device receiving the speech dialog data of the dumb device; and responsive to a determination that the dumb device terminated a connection to the ad hoc communication network or to receipt by the speech-enabled device of a request to de-register the dumb device, delete the speech dialog data of the dumb device from the speech-enabled device.

20. The computer program product of claim 16, wherein the computer-readable program when executed on the computer further causes the computer to:

perform an authentication between the dumb device and a speech-enabled device prior to the speech-enabled device receiving the speech dialog data of the dumb device; and responsive to the authentication indicating at least that the speech dialog data of the dumb device is in a shared integration language that is common to speech dialog data of the speech-enabled device, establish an ad hoc communication network between the dumb device and the speech-enabled device to communicate the speech dialog data of the dumb device to the speech-enabled device.

* * * * *